United States Patent [19]
Naito

[11] Patent Number: 5,183,131
[45] Date of Patent: Feb. 2, 1993

[54] SYSTEM FOR CONTROLLING DRIVE TORQUE DISTRIBUTING CLUTCH OF VEHICLE

[75] Inventor: Genpei Naito, Yokosuka, Japan

[73] Assignee: Nissan Motor Co., Ltd., Yokohama, Japan

[21] Appl. No.: 687,482

[22] Filed: Apr. 19, 1991

[30] Foreign Application Priority Data

Apr. 20, 1990 [JP] Japan .................. 2-104639

[51] Int. Cl.$^5$ .............................. B60K 17/34
[52] U.S. Cl. .................. 180/233; 180/248; 364/424.1
[58] Field of Search ........... 180/233, 247, 248, 249; 364/424.1, 426.01; 192/0.005, 0.076, 0.094

[56] References Cited

U.S. PATENT DOCUMENTS

| | | | |
|---|---|---|---|
| 4,679,463 | 7/1987 | Ozaki et al. | 74/711 |
| 4,715,466 | 12/1987 | Ishii et al. | 180/233 |
| 4,741,407 | 5/1988 | Torii et al. | 180/76 |
| 4,754,834 | 7/1988 | Ozaki et al. | 180/233 |
| 4,776,424 | 10/1988 | Naito | 180/233 |
| 4,790,404 | 12/1988 | Naito | 180/197 |
| 4,846,298 | 7/1989 | Naito | 180/233 |
| 4,887,689 | 12/1989 | Naito | 180/233 |
| 5,010,974 | 4/1991 | Matsuda | 180/233 |
| 5,014,809 | 5/1991 | Matsuda | 180/233 X |

FOREIGN PATENT DOCUMENTS 61-157437 7/1986 Japan .
63-22236 2/1988 Japan .

Primary Examiner—Joseph E. Valenza
Assistant Examiner—Tuan N. Nguyen
Attorney, Agent, or Firm—Foley & Lardner

[57] ABSTRACT

A control system comprises a clutch for limiting a differential action between left and right drive wheels or varying a driving torque distribution between front and rear drive axles of a four wheel drive vehicle, a sensor group and a controller for controlling an engagement force of the clutch to control the differential limiting force or the torque distribution. The sensor group senses a decelerating condition of the vehicle, a vehicle lateral acceleration and a vehicle speed. The controller increases the clutch engagement force, so as to restrain tack-in, in accordance with the lateral acceleration when the vehicle is in a decelerating operation and the lateral acceleration is high. When the vehicle speed increases, the controller increases a rate of increase of the clutch engagement force with respect to the lateral acceleration to improve both of a high speed cornering stability and a low speed steering response.

16 Claims, 7 Drawing Sheets

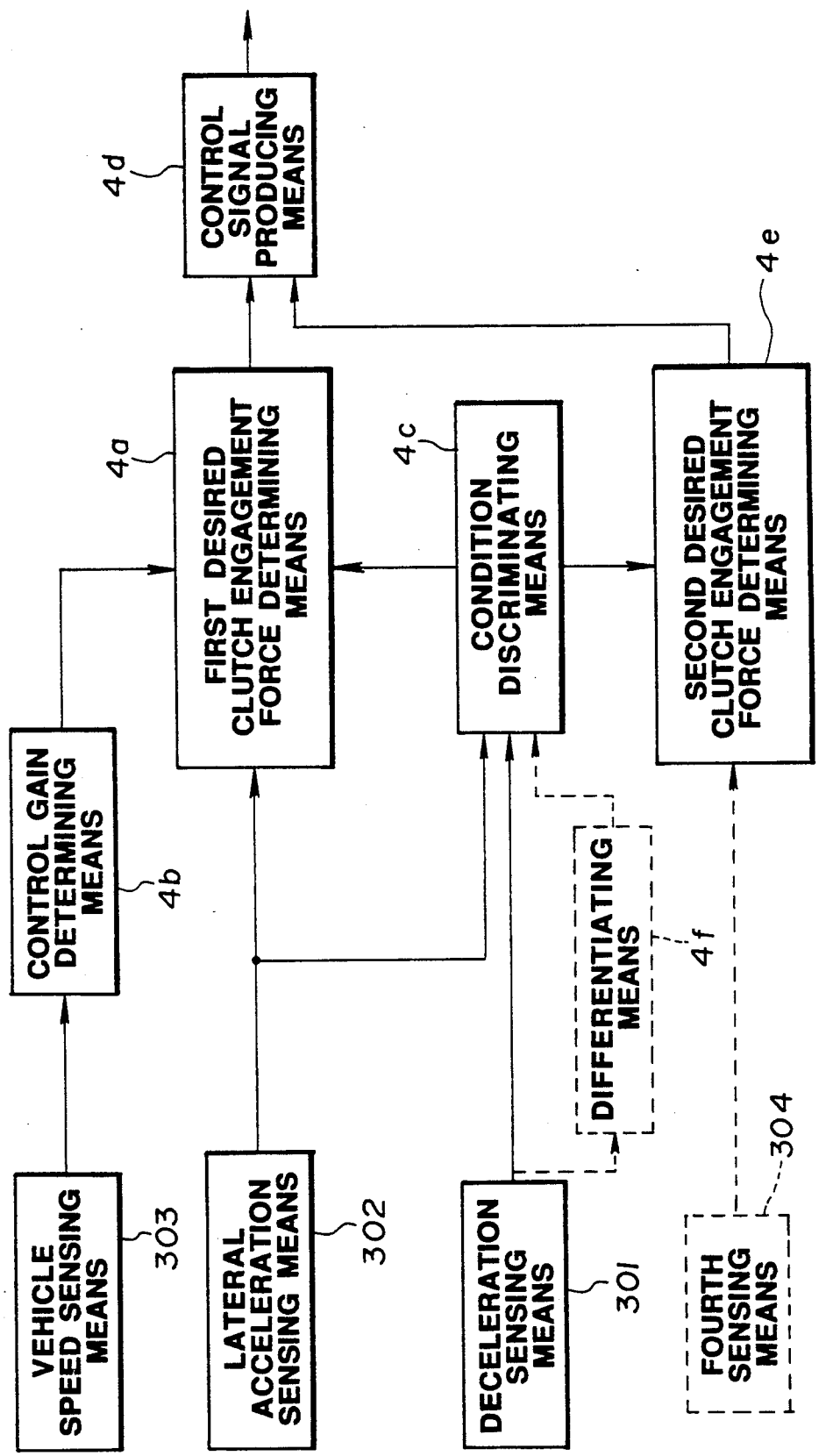

SYSTEM FOR CONTROLLING DRIVE TORQUE DISTRIBUTING CLUTCH OF VEHICLE

BACKGROUND OF THE INVENTION

The present invention relates to a control system for controlling a driving torque distribution between two drive wheels of a vehicle, and more specifically to a control system for controlling a clutch engagement force of a torque distributing clutch for varying a driving torque distribution between front and rear drive wheels of a four wheel driving vehicle or between left and right drive wheels.

A Japanese Utility Model Provisional Publication No. 63-22236(Application No. 61-115525) shows a conventional differential limiting clutch control system. This system increases a differential limiting force to prevent tack-in when a vehicle lateral acceleration is high and the vehicle is decelerated. However, this conventional system is arranged to increase the clutch engagement force in accordance with only the lateral acceleration. Therefore, when the clutch engagement force is increased so as to improve a high vehicle speed cornering stability, then the clutch engagement force becomes excessive and the vehicle becomes understeering in a low speed cornering operation. When, on the other hand, the clutch engagement force is held at a low level to improve a low speed steering response, then the high speed cornering stability becomes poor.

SUMMARY OF THE INVENTION

It is an object of the present invention to provide a vehicle driving torque distribution control system which can restrain tack-in when the vehicle is in a decelerating operation and the vehicle lateral acceleration is high, and which can improve both of the high speed cornering stability and the low speed steering response.

According to the present invention, a driving torque distribution control system for a vehicle comprises a torque distributing mechanism, a torque distributing clutch means, a sensor means and a controller means. The torque distributing mechanism is a mechanism, such as a transfer mechanism or a differential gear mechanism, for dividing a driving torque between first and second drive wheels of the vehicle. The torque distributing clutch means is a means for varying a torque distribution between the first and second drive wheels by varying a clutch engagement force in response to a control signal. The clutch means is provided between a driving torque input side of the distributing mechanism and a driving torque output side of the mechanism. The sensor means comprises one or more sensors for sensing a decelerating condition of the vehicle, a lateral acceleration (or a centripetal acceleration) of the vehicle, and a vehicle speed of the vehicle. The controller means controls the clutch engagement force of the torque distributing clutch means by producing the control signal in accordance with information supplied from the sensor means. The controller means increases the clutch engagement force in accordance with the lateral acceleration when the vehicle is decelerated, and increases a rate of increase of the clutch engagement force with respect to the lateral acceleration when the vehicle speed increases.

When a differential limiting clutch between left and right drive wheels is controlled, the torque distribution control system of the invention can restrain tack-in by increasing the differential limiting force when the lateral acceleration is high and the vehicle is in a decelerating operation. In tack-in, the outside wheel rotates faster than the inside wheel of a turn, and the vehicle spins. The control system of the invention increases the differential limiting force so as to prevent the difference between the rotational speeds of the outside and inside wheels, and generates a yaw moment acting in the direction opposite to a tack-in direction (such a direction as to cause avehicle spin). In this way, the control system can control tack-in. When the vehicle speed is high, the control system increases the differential limiting force steeply with the lateral acceleration. Therefore, the control system can improve a high speed cornering stability by providing the differential limiting force of a sufficient magnitude to restrain tack-in and ensure a braking stability during a turn. When the vehicle speed is low, the control system increases the differential limiting force gradually. Therefore, the control system can provide an appropriate amount of tack-in, and improve a low speed steering response.

BRIEF DESCRIPTION OF THE DRAWINGS

FIG. 1B is a block diagram showing functional means contained in a controller means of a first or second embodiment of the present invention.

DETAILED DESCRIPTION OF THE INVENTION

Figure 1A:
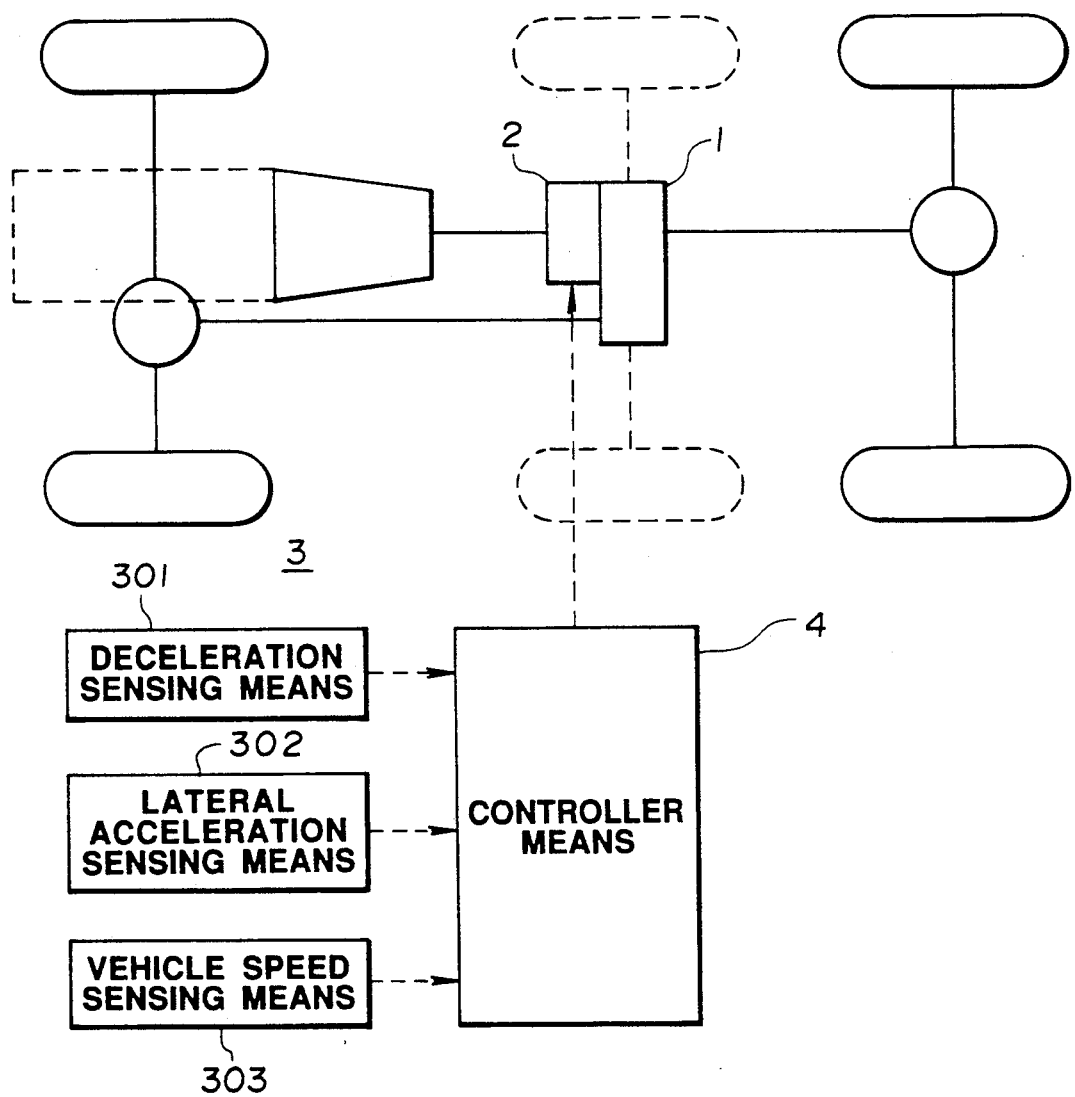
FIG. 1A is a schematic view showing an arrangement of various means which can be employed in the present invention.

FIG. 1A schematically shows an arrangement of functional means which can be employed in a vehicle driving torque distribution control system according to a first embodiment of the present invention. As shown in FIG. 1A, the driving torque distribution control system of the first embodiment can be composed of a torque distributing (or dividing) mechanism 1, a torque distributing clutch means 2, a sensor means 3 and a controller means 4. This control system is mounted on a motor vehicle such as an automobile.

The torque distributing mechanism 1 may be provided between left and right drive wheels, or between front and rear drive axles of the vehicle. The vehicle may be a two wheel drive vehicle, or a four wheel drive vehicle. The torque distributing clutch means 2 may comprise a differential limiting clutch or a transfer clutch. It is possible to employ a transfer clutch system disclosed in a U.S. Pat. No. 4,754,834. The explanation and FIGS. 2 and 3 of this patent about a transfer 23, a transfer clutch 49 and a hydraulic circuit 57 for operating the transfer clutch are herein incorporated by reference. In any case, the torque distributing mechanism 1 may comprise an input rotating member for receiving an input driving torque (such as an engine torque), a first output rotating member for delivering an output driving torque toward a first drive wheel of the vehicle, and a second output rotating member for delivering an output driving torque toward a second drive wheel of the vehicle. The first output member is drivingly connected with the input member through a first torque path, and the second output member is drivingly connected with the input member through a second torque path. The torque distributing clutch means 2 may include at least one clutch which is disposed in at least one of the first and second torque paths of the torque distributing mechanism 1. When the transfer of the above-mentioned U.S. Pat. No. 4,754,834 is employed, the first output member is connected with the rear wheels, the input member is always connected with the first output member, and the torque distributing clutch means 2 includes only one clutch which is disposed in the second torque path between the input member and the second output member for delivering the driving torque toward the front wheels. The torque distributing clutch means 2 varies a torque distribution between the first and second drive wheels by varying a clutch engagement force in response to a control signal.

The sensor means 3 is a means for sensing a decelerating condition of the vehicle, a lateral acceleration of the vehicle and a vehicle speed of the vehicle. The sensor means 3 of this example comprises a deceleration sensing means 301, a lateral acceleration sensing means 302 for sensing the lateral acceleration and a vehicle speed sensing means 303 for sensing the vehicle speed. The deceleration sensing means 301 is a means for sensing the deceleration condition which is a vehicle condition indicative and characteristic of a deceleration of the vehicle. The deceleration sensing means 301 may comprise a brake condition sensor for sensing the vehicle decelerating condition by detecting an actuation (or application) of a brake system of the vehicle, or may comprise an accelerator condition sensor for sensing the vehicle decelerating condition by detecting a returning movement of a movable element, such as an accelerator pedal, of an accelerator system of the vehicle. Furthermore, the deceleration sensing means 301 may comprise a longitudinal acceleration (or deceleration) sensor (G sensor) for sensing a longitudinal acceleration (or deceleration) of the vehicle, which is an acceleration in the longitudinal direction (x direction) of the vehicle. In this case, it is possible to detect the decelerating condition by comparing the longitudinal deceleration with a predetermined value.

The controller means 4 is designed to control the clutch engagement force of the torque distributing clutch means 2 by producing the control signal by processing sensor signals supplied from the sensor means 3. The controller means 4 increases the clutch engagement force in accordance with the lateral acceleration when the vehicle is decelerated, and increases a rate of increase of the clutch engagement force with respect to the lateral acceleration when the vehicle speed increases. The controller means 4 of the first embodiment can be composed of five functional means 4a, 4b, 4c, 4d and 4e as shown in FIG. 1B. Functions of these means are explained with reference to a flow chart of FIG. 5.

FIGS. 2-7 shows the driving torque distribution control system of the first embodiment more concretely. The driving torque distribution control system of this embodiment is a differential (slip) limiting force control system for controlling a driving torque distribution between left and right drive wheels.

Figure 2:
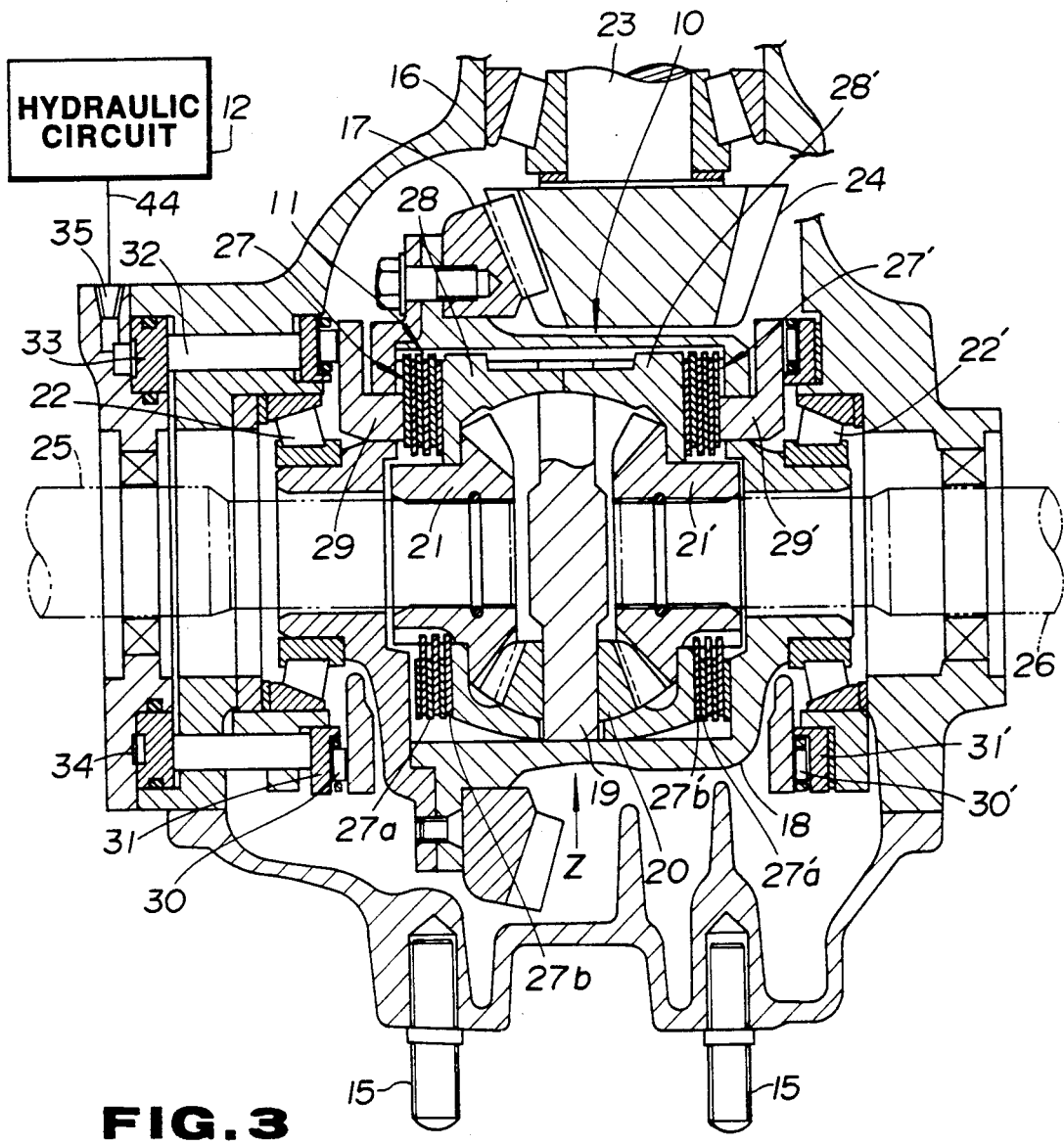
FIG. 2 is a sectional view of a differential gear mechanism employed in the first and second embodiments of the invention.
Figure 3:
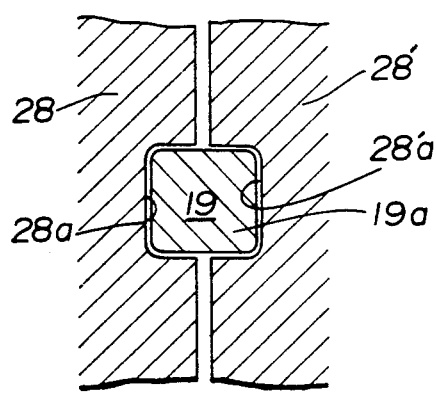
FIG. 3 is a view taken in a direction shown by an arrow Z in FIG. 2.

In this embodiment, the torque distributing mechanism 1 comprises a differential gear mechanism 10 shown in FIGS. 2 and 3. The torque distributing clutch means 2 comprises a differential limiting clutch system 11 operated by a hydraulic pressure supplied from a hydraulic circuit (system) 12. The controller means 4 comprises a control unit 13 shown in FIG. 4. The sensor means 3 comprises a sensor group 14 including sensors for sensing operating conditions of the vehicle.

The differential gear mechanism 10 is a gear system designed to perform a differential function of permitting one of the left and right drive wheels to rotate faster than the other, and a torque distributing function of equally distributing engine power between the left and right drive wheels. The differential gear mechanism 10 has a housing 16 which is fixed to the vehicle body by stud bolts 15. The differential gear mechanism 10 further includes a ring gear 17, a differential case 18, a pinion mate shaft 19, at least one differential pinion 20, and left and right side gears 21 & 21'. These components are all rotating members, and they are enclosed in the housing 16.

The differential case 18 is rotatably supported on the housing 16 by tapered roller bearings 22 & 22'. The ring gear 17 is fixed to the differential case 18 so that the ring gear 17 and the case 18 rotate together. The ring gear 17 is in engagement with a drive pinion 24 provided in an end of a propeller shaft (or drive shaft) 23 of the vehicle. Therefore, engine torque is transmitted from the propeller shaft 23, through the drive pinion gear 24 and the ring gear 17, to the differential case 18.

The left and right side gears 21 & 21' are, respectively, connected with left and right axle shafts 25 and 26 of the left and right drive wheels of the vehicle.

The differential limiting clutch system 11 is provided between a driving torque input side and a driving torque output side of the differential mechanism 10, and arranged to produce a differential limiting torque by receiving a hydraulic oil pressure. The clutch system 11 is disposed in the differential case 18. The clutch system 11 of this embodiment has left and right multiple disc friction clutches 27 & 27', pressure rings 28 & 28', reaction plates 29 & 29', thrust bearings 30 & 30', spacers 31 & 31', push rods 32, a pressure piston 33, a fluid chamber 34, and a pressure port 35.

Each of the friction clutches 27 & 27' has friction plates 27a or 27'a, and friction discs 27b or 27'b. The friction plates 27a & 27'a of both clutches are engaged with the differential case 18 (the torque input side) so as to prevent relative rotation therebetween. The friction discs 27b of the left clutch 27 are engaged with the left side gear 21 (the torque output side) so as to prevent relative rotation therebetween. The friction discs 27'b of the right clutch 27' are engaged with the right side gear 21' (the torque output side) so as to prevent relative rotation therebetween. In each clutch, the friction plates and discs are alternately arranged, and the alternating pack of the friction plates and discs is sandwiched between the adjacent pressure ring (28 or 28') and reaction plate (29 or 29').

The pinion mate shaft 19 has end portions 19a each having a square cross sectional shape as shown in FIG. 3. Each square end portion 19a of the pinion mate shaft 19 is received in a square hole formed by confronting rectangular recesses 28a and 28'a of the left and right pressure rings 28 & 28'. This structure prevents occurrence of a thrust force due to a rotational wheel speed difference between the left and right wheels as in a torque proportional type differential limiting means. U.S. Pat. Nos. 4,741,407; 4,679,463 and 4,790,404 show similar differential gear mechanisms.

When the hydraulic pressure is supplied to the pressure port 35, the pressure piston 33 moves to the right as viewed in FIG. 2, in parallel to the axis of the side gears 21 & 21', and applies a force corresponding to the fluid pressure to engage the clutches 27 & 27'. A clutch engagement force is transmitted through the piston rods 32, the spacer 31 and the thrust bearing 30, to the reaction plate 29, so that the friction plates and discs 27a and 27b are compressed between the reaction plate 29 and the pressure ring 28. A reaction force is applied from the housing 16 to the right clutch 27'. Therefore, the friction plates and discs 27'a and 27'b are also engaged between the reaction plate 29' and the pressure ring 28'.

The hydraulic circuit (or fluid pressure source) 12 includes an oil pressure pump 40, a pump motor 41, a pump pressure passage 42, a drain passage 43, a control pressure passage 44 and an electromagnetic proportional pressure reducing valve 46 having a valve solenoid 45. The reducing valve 46 receives an output pressure of the pump 40 through the pump pressure passage 42, and produces a control pressure P which is proportional to the magnitude of a control current signal i supplied from the control unit 13. The control pressure P is supplied through the control pressure passage 44 and the pressure port 35, to the pressure chamber 34 of the differential limiting clutch system 11. In this way, the control unit 13 can control the clutch fluid pressure of the clutch system 11 by sending the control current signal i to the valve solenoid 45. A differential limiting force T produced by the limiting clutch system 11 is proportional to the control pressure P, as expressed by the following relationship.

$$T \propto P \cdot \mu \cdot n \cdot r \cdot A_c$$

where $\mu$ is a friction coefficient between the friction plates and discs, n is the number of the friction plates, r is an average radius of the clutch, and $A_c$ is a pressure receiving area. Therefore, the control unit 13 can control the differential limiting force T by varying the control pressure P.

Figure 4:
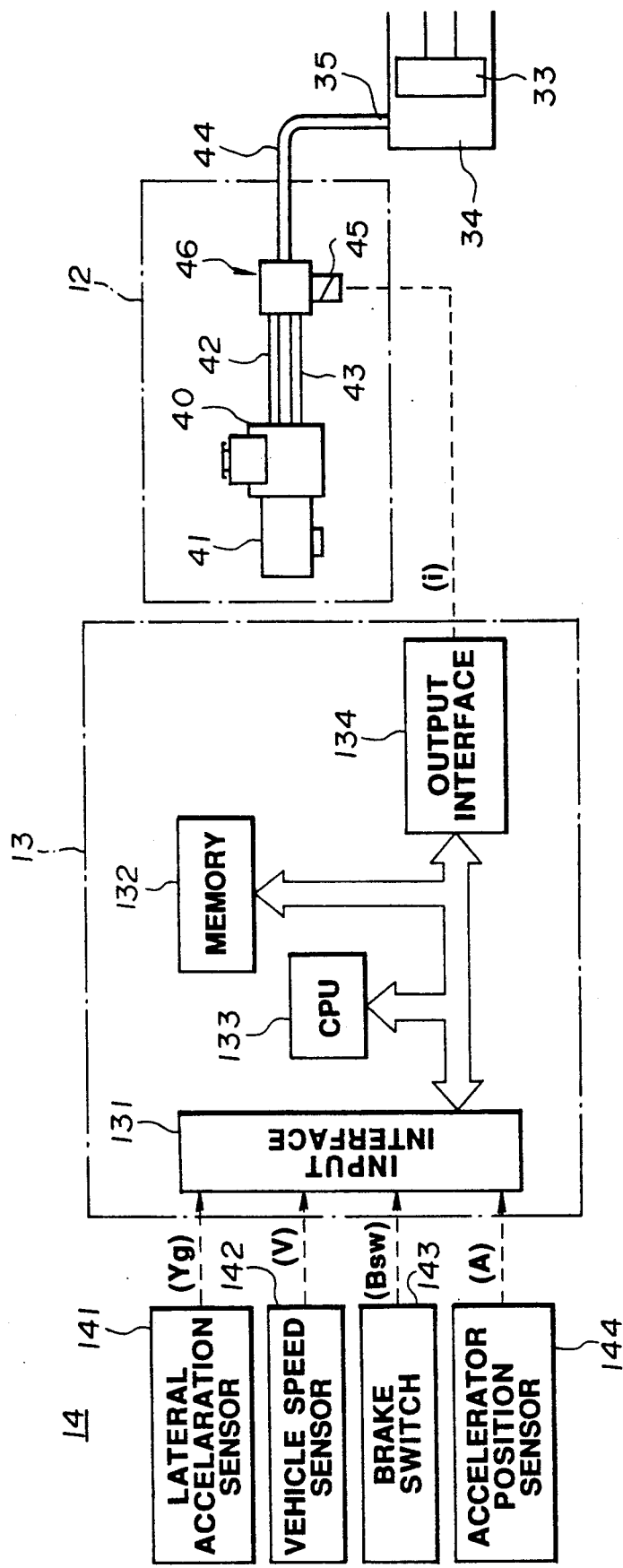
FIG. 4 is a schematic view showing sensors, a control unit, and an actuator employed in the first and second embodiments of the invention.

The control unit 13 is made up of an onboard microcomputer and one or more peripheral equipments. In this embodiment, the control unit 13 includes an input interface circuit 131, a memory section 132, a central processing unit (CPU) 133, and an output interface circuit 134, as shown in FIG. 4.

The sensor group 14 of this embodiment comprises a lateral acceleration sensor 141, a vehicle speed sensor 142, and a brake switch 143. The lateral acceleration sensor 141 senses the lateral acceleration Yg of the vehicle, and produces a lateral acceleration signal representing the sensed lateral acceleration. Normally, the lateral acceleration can be considered equal to a centripetal acceleration of the vehicle. The lateral acceleration sensing means 302 of this embodiment comprises the lateral acceleration sensor 141. The vehicle speed sensor 142 senses the vehicle speed V of the vehicle, and produces a vehicle speed signal representing the sensed vehicle speed. The vehicle speed sensing means 303 of this embodiment comprises the vehicle speed sensor 142.

The deceleration sensing means 301 of the first embodiment comprises the brake switch (or brake condition sensor) 143, which is designed to sense a condition of a brake system of the vehicle (such as the position of a movable element of the brake system). The brake switch 143 produces a brake switch signal which is in an on state when the brake system is actuated.

Figure 5:
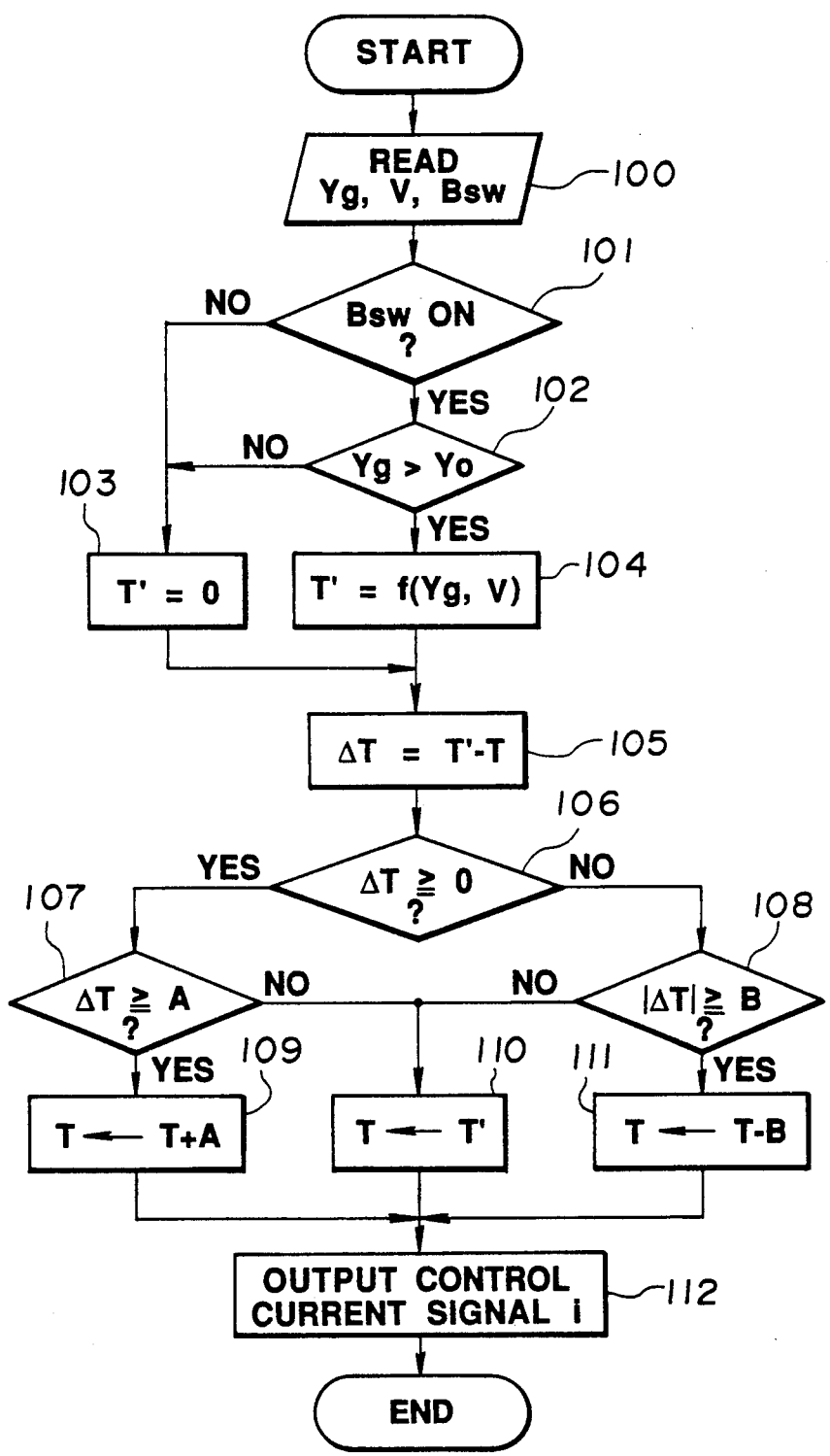
FIG. 5 is a flow chart showing a control procedure performed by the control unit of the first embodiment.

The control unit 13 of the first embodiment controls the clutch engagement force according to a control procedure shown in FIG. 5. The control procedure is periodically repeated at regular intervals of a predetermined control cycle.

At a step 100, the control unit 13 reads current values of the lateral acceleration Yg, the vehicle speed V, and the brake switch signal Bsw.

At a step 101, the control unit 13 determines whether the brake switch signal Bsw is in the on state or in an off state. From the step 101, the control unit 13 proceeds to a step 102 if the brake switch signal Bsw is in the on state, and to a step 103 if the brake switch signal Bsw is in the off state. At the step 103, the control unit 13 sets a desired clutch engagement force T' equal to zero (T'=0). The step 103 corresponds to a second desired clutch engagement force determining means 4e shown in FIG. 1B.

At the step 102, the control unit 13 determines whether the lateral acceleration Yg is higher than a predetermined threshold lateral acceleration value Yo. From the step 102, the control unit 13 proceeds to a step 104 if the lateral acceleration Yg is higher than Yo (Yg>Yo), and to the step 103 if the lateral acceleration Yg is equal to or lower than Yo (Yg≦Yo). The decision steps 101 and 102 correspond to a condition discriminating means 4c shown in FIG. 1B.

Figure 6:
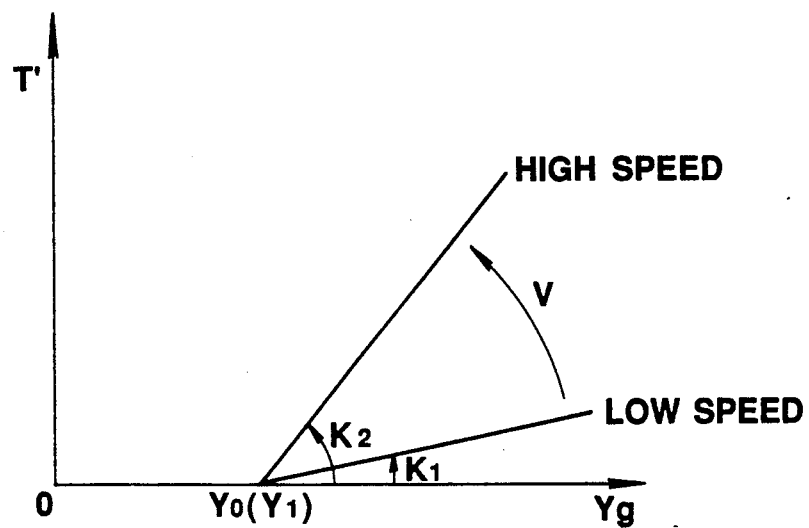
FIG. 6 is a graph showing a characteristic of a desired clutch engagement force with respect to a vehicle lateral acceleration. The characteristic of FIG. 6 is used in the first and second embodiments.
Figure 7:
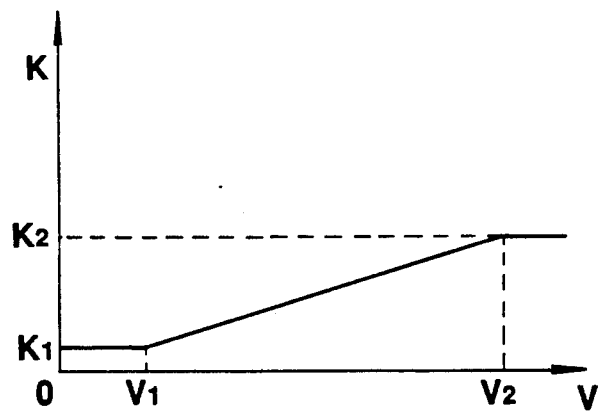
FIG. 7 is a graph showing a characteristic of a control gain with respect to the vehicle speed. This characteristic is employed in the first and second embodiments.

At the step 104, the control unit 13 determines the desired clutch engagement force T' according to characteristics shown in FIGS. 6 and 7. First, the control unit 13 determines a value of a control gain K according to a K-V characteristic shown in FIG. 7. This operation corresponds to a control gain determining means 4b shown in FIG. 1B. Then, the control unit 13 determines the desired clutch engagement force T' according to a T'-Yg characteristic shown in FIG. 6 by using the current value of the lateral acceleration, and the value of the control gain K corresponding to the current value of the vehicle speed V. This operation corresponds to a first desired clutch engagement force determining means 4a. It is possible to determine function values by using a table look-up or solving mathematical equations. For example, the desired clutch engagement force T' is given by the following equation.

$$\begin{aligned} T' &= f(V, Yg) \\ &= K \times V \times (Yg - Yo) \geq 0 \end{aligned}$$

As shown in FIG. 7, the control gain K is a monotone nondecreasing function of the vehicle speed V. The control gain K is equal to a predetermined minimum control gain value $K_1$ when the vehicle speed V is lower than a predetermined first speed value $V_1$, and equal to a predetermined maximum control gain value $K_2$ when the vehicle speed V is higher than a predetermined second speed value $V_2$ which is higher than $V_1$. In the vehicle speed range between $V_1$ and $V_2$, the control gain K is increased linearly with increase in the vehicle speed V.

As shown in FIG. 6, the desired clutch engagement force T' determined in the step 104 is a monotone nondecreasing function of the lateral acceleration Yg. When the lateral acceleration Yg is higher than the threshold lateral acceleration value $Y_0$, the desired clutch engagement force T' is increased linearly with increase in the lateral acceleration. The control gain K is equal to the slope of an inclined straight line segment of the T'-Yg characteristic.

A program section of steps 105~111 is a filtering section for preventing an abrupt change of a command clutch engagement force T to be represented by the control signal.

At the step 105, the control unit 13 calculates a difference ΔT resulting from substraction, from the current value of the desired clutch engagement force T', of a previous value of the command clutch engagement force T which was determined one control cycle ago in the last execution of the program shown in FIG. 5. That is, ΔT=T'−T.

At the step 106, the control unit 13 checks the sign of the amount of change ΔT of the clutch engagement force per control cycle, and determines whether the clutch engagement force is increasing or decreasing.

If ΔT≧0, then the control unit 13 determines, at the step 107, whether the amount of change ΔT is equal to or greater than a first predetermined value A. Then, the control unit 13 proceeds to the step 109 to prevent an abrupt increase of the clutch engagement force if ΔT≧A, and proceeds to the step 110 if ΔT<A.

If ΔT is smaller than zero, then the control unit 13 proceeds from the step 106 to the step 108, and determines whether the magnitude (absolute value) of ΔT is equal to or greater than a second predetermined value B. If |ΔT|≧B, the control unit 13 proceeds to the step 111 to prevent an abrupt decrease of the clutch engagement force. If |ΔT|<B, the control unit 13 proceeds to the step 110.

At the step 109, the control unit 13 sets the command clutch engagement force T equal to a sum of the previous value of the command clutch engagement force T and the maximum allowable amount of increase A in order to restrict the amount of increase of the clutch engagement force. That is, T←T+A.

At the step 110, the control unit 13 sets the command clutch engagement force T equal to the current value of the desired clutch engagement force T' because the amount of increase or decrease of the clutch engagement force is in an allowable range. That is, T←T'.

At the step 111, the control unit 13 sets the command clutch engagement force T equal to a difference between the previous value of the command clutch engagement force T and the maximum allowable amount of decrease B, to restrict the amount of decrease of the clutch engagement force. That is, T←T−B.

At a step 112, the control unit 13 delivers a control current signal i representing the command clutch engagement force determined at one of the steps 109, 110 and 111, to the valve solenoid 45 of the electromagnetic proportional type pressure reducing valve 46. Therefore, the hydraulic circuit 12 produces the control hydraulic pressure P which can produce an actual clutch engagement force substantially equal to the command clutch engagement force T represented by the control signal i. The steps 105~112 corresponds to a control signal producing means 4d shown in FIG. 1B.

The thus-constructed control system of the first embodiment can provide desirable driving performances, as follows:

(I) In normal driving operations:

When the vehicle is in a straight line motion, or in a steady state turning motion, either or both of the answers of the decisions steps 101 and 102 is negative. In such normal driving operations, both of a first condition required by the step 101 and a second condition required by the step 102 are not satisfied simultaneously. Therefore, the control unit 13 sets the desired clutch engagement force T' equal to zero at the step 103, so that the differential limiting force is held equal to zero.

As a result, the differential gear mechanism 10 functions as a conventional differential gear for permitting inside and outside drive wheels to rotate at different speeds during a turn.

In the example shown in FIG. 5, the second desired clutch engagement force determining means 4e corresponding to the step 103 is designed to fix the (second) desired clutch engagement force T' at zero. However, it is optional to program the step 103 so as to determine the desired clutch engagement force in accordance with one or more of vehicle operating conditions such as a wheel speed difference between the left and right drive wheels, an accelerator opening degree and the vehicle speed. In this case, the second desired clutch engagement force determining means 4e is connected with a fourth sensing means 304 for sensing an additional vehicle condition such as the wheel speed difference between the left and right drive wheels, and arranged to determine a second desired clutch engagement force in accordance with a sensor signal supplied from the fourth sensing means 304.

(II) In high lateral acceleration turning and decelerating operations:

When the vehicle is decelerated by depressing the brake pedal during a high lateral acceleration turn, the first condition of the step 101 and the second condition of the step 102 are both satisfied simultaneously. Therefore, the control unit 13 determines the (first) desired clutch engagement force T' at the step 104, and increase the differential limiting force so as to improve the vehicle stability in a braking operation on a turn. When the driver depresses the brake pedal during a cornering operation with a high lateral acceleration, a yaw moment acts around the yaw axis of the vehicle in a tack-in direction (a vehicle spin direction), and accordingly the outside wheel tries to rotate faster than the inside wheel of the vehicle turn. However, the control system increases the differential limiting force for limiting the speed difference between the inside and outside wheels, and generates a counter yaw moment (differential limiting moment) which tends to rotate the vehicle in the direction opposite to the tack-in direction, and which counteracts the rotation moment in the tack-in direction. Thus, the control system of this embodiment shifts the steering characteristic of the vehicle from the oversteer side to the understeer side by applying this differential limiting torque, and restrains a tack-in due to an excessive yaw moment in the tack-in direction.

When the vehicle speed V is high, the control system increases the control gain K, and by so doing, increases the differential limiting force to sufficiently restrain the tack-in amount and to ensure the vehicle stability in a cornering and braking operation where the lateral acceleration and the vehicle speed are both high.

When the vehicle speed V is low, the control system decreases the control gain K. Therefore, the control system can provide a proper amount of the tack-in by keeping an oversteering tendency, and improve the steering response of the yawing motion. Thus, the control system of this embodiment can achieve both of the cornering stability in the high vehicle speed range, and the superior steering response characteristic in the low vehicle speed range.

Figure 8:
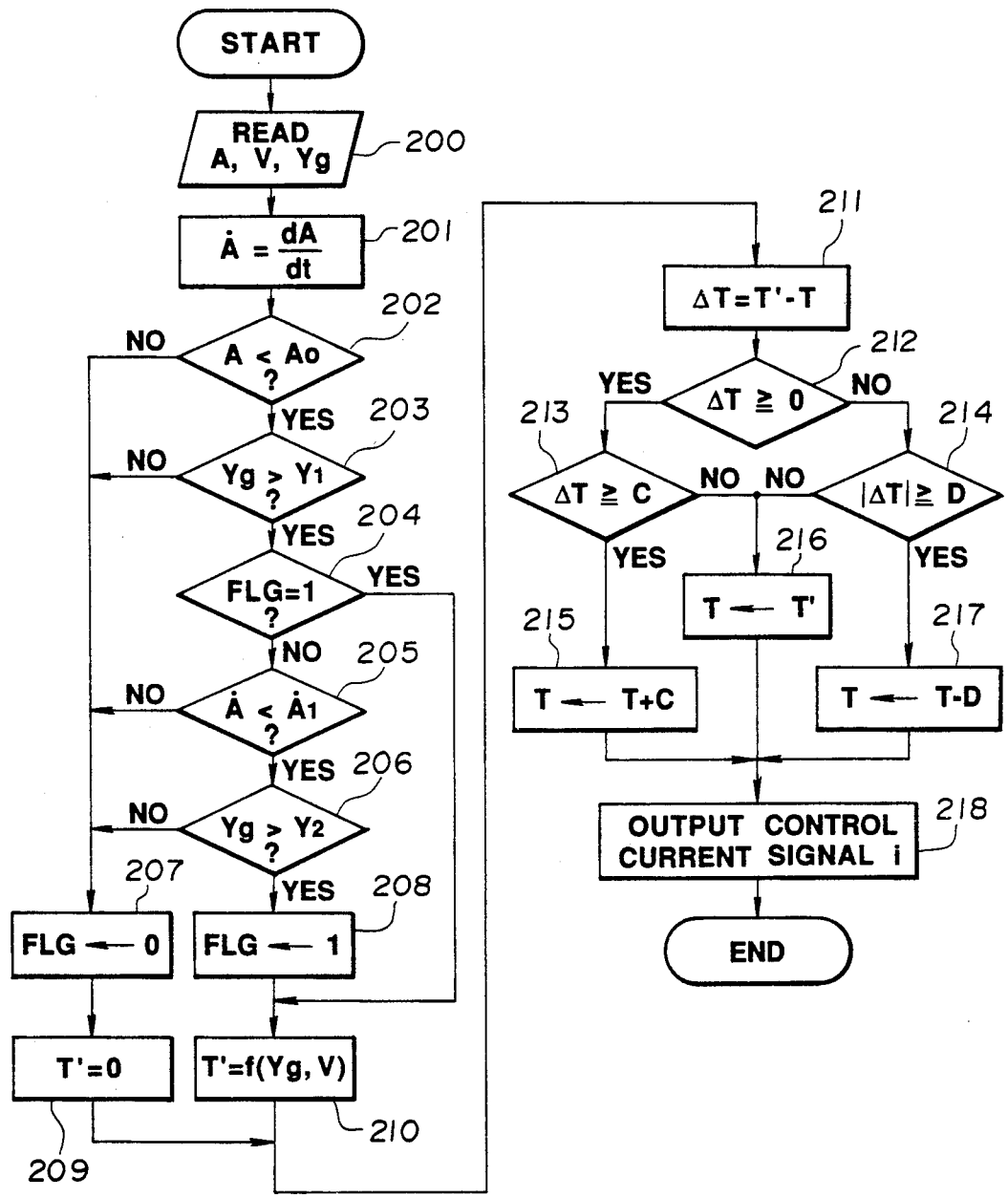
FIG. 8 is a flow chart showing a control procedure performed by the control unit of the second embodiment.

FIG. 8 shows a second embodiment of the present invention. A control system of the second embodiment is almost the same as the differential limiting force control system of the first embodiment. The differential limiting force control system of the second embodiment is different from the control system of the first embodiment in the following points.

The sensor group 14 of the second embodiment comprises the lateral acceleration sensor 141, the vehicle speed sensor 142 and an accelerator position sensor 144 shown in FIG. 4. The accelerator position sensor 144 senses an accelerator opening degree (or throttle opening degree) of an accelerator system of the vehicle by sensing a position of a movable element (such as an accelerator pedal or a throttle valve) of the accelerator system.

In the first embodiment, the control system is arranged to sense the decelerating condition of the vehicle by sensing the braking operation of the vehicle. The control system of the first embodiment initiates and continues a vehicle speed responsive tack-in control when the brake pedal is depressed and at the same time the lateral acceleration Yg is higher than the predetermined threshold value Yo, and terminates the vehicle speed responsive tack-in control when the brake switch signal becomes off or when the lateral acceleration Yg becomes equal to or lower than the threshold value Yo.

In the second embodiment, the control system is arranged to sense the decelerating condition of the vehicle by sensing a releasing operation of an accelerator pedal. The control system of the second embodiment initiates the vehicle speed responsive tack-in control when all of the following three requirements are satisfied. First, an accelerator opening degree A should be smaller than a predetermined accelerator opening degree value Ao. Second, the time rate of change $\dot{A}$ of the accelerator opening degree should be smaller than a predetermined accelerator speed value $\dot{A}_1$. Third, the lateral acceleration Yg should be higher than a predetermined second lateral acceleration value Y2. The control system of the second embodiment continues the vehicle speed responsive tack-in control when the accelerator opening degree A is smaller than the predetermined accelerator opening degree value Ao, and at the same time the lateral acceleration Yg is higher than a predetermined first lateral acceleration value Y1 which is equal to or lower than the second lateral acceleration value Y2. The control system of the second embodiment terminates the vehicle speed responsive tack-in control when the accelerator opening degree A becomes equal to or greater than the predetermined opening degree value Ao or the lateral acceleration Yg becomes equal to or lower than the first lateral acceleration value Y1.

The control unit 13 of the second embodiment performs a control procedure shown in FIG. 8 at regular time intervals of the predetermined control cycle.

At a step 200, the control unit 13 reads current values of the lateral acceleration Yg, the vehicle speed V, and the accelerator opening degree A.

At a step 201, the control unit 13 calculates the time rate of change $\dot{A}$ of the accelerator opening degree A by using the following mathematical equation.

$$\dot{A} = \frac{dA}{dt} = \frac{A_n - A_{n-1}}{\Delta t}$$

In this equation, $\Delta t$ is the control cycle (or a time period of the control cycle), $A_n$ is the current value of the accelerator opening degree A, $A_{n-1}$ is a previous value of the accelerator opening degree which has been obtained one control cycle ago in the last execution of the control program. The step 201 corresponds to a differentiating means 4f for determining the time rate of change of the accelerator opening degree.

At a step 202, the control unit 13 compares the accelerator opening degree A with the predetermined opening degree value A0, and determines whether the accelerator opening degree A is smaller than the predetermined opening degree value A0. If it is, then the control unit 13 produces a first affirmative signal and proceeds to a step 203. If A is equal to or greater than A0, then the control unit 13 produces a first negative signal, and proceeds to a step 207.

At the step 203, the control unit 13 compares the lateral acceleration Yg with the predetermined first lateral acceleration value Y1 which is the lowest value of a high lateral acceleration range. If Yg>Y1, then the control unit 13 produces a second affirmative signal, and proceeds to a step 204. If Yg≦Y1, then the control unit 13 produces a second negative signal, and proceeds to the step 207.

At the step 204, the control unit 13 determines whether a tack-in control flag (or flag signal) FLG is one (first signal state) or not. If FLG=1, the control unit 13 produces a third affirmative signal and proceeds to a step 210. If FLG=0 (second signal state), then the control unit 13 produces a third negative signal and proceeds to a step 205.

At the step 205, the control unit 13 compares the time rate of change $\dot{A}$ of the accelerator opening degree with the predetermined accelerator speed value $\dot{A}_1$, and determines whether $\dot{A}$ is lower than $\dot{A}_1$. If $\dot{A}<\dot{A}_1$, then the control unit 13 produces a fourth affirmative signal and proceeds to a step 206. If $\dot{A}\geqq\dot{A}_1$, then the control unit 13 produces a fourth negative signal and proceeds to the step 207. The predetermined accelerator speed value $\dot{A}_1$ is negative ($\dot{A}_1<0$), and the control unit 13 checks the returning speed of the accelerator toward its closed position.

At the step 206, the control unit 13 determines whether the lateral acceleration Yg is higher than the predetermined second lateral acceleration value Y2 ($\geqq$Y1). The second lateral acceleration value Y2 is a lower boundary of an excessive lateral acceleration range in which a tack-in can occur. If Yg>Y2, then the control unit 13 produces a fifth affirmative signal and proceeds to a step 208. If Yg≦Y2, ten the control unit 13 produces a fifth negative signal and proceeds to the step 207.

At the step 207, the control unit 13 sets the tack-in control flag FLG to zero. At the step 208, the control unit 13 sets the flag FLG to one.

In this way, the control unit 13 of the second embodiment starts the vehicle speed dependent tack-in control when a first requirement of the step 202, a second requirement of the step 203, a third requirement of the step 205 and a fourth requirement of the step 206 are all satisfied ($A < A_0$, $Yg > Y_1$, $A < A_1$ and $Yg > Y_2$). The control unit 13 continues the vehicle speed responsive tack-in control as long as both of the conditions of the steps 202 and 203 are satisfied ($A < A_0$ and $Yg > Y_1$). The control unit 13 cancels the vehicle speed responsive tack-in control when at least one of the conditions of the steps 202 and 203 is not satisfied ($A \geq A_0$ or $Yg \leq Y_1$).

The steps 209 and 210 of the second embodiment are identical to the steps 103 and 104 of the first embodiment, respectively. A program section consisting of steps 211~217 is a filtering section identical to the filtering section of the steps 105~111. A predetermined constant C appearing in the steps 213 and 215 corresponds to the constant A of the steps 107 and 109. A constant D of the steps 214 and 217 corresponds to the constant B of the steps 108 and 111.

The control system of the second embodiment can provide superior driving performances as in the first embodiment.

The present invention is applicable to a driving force distribution control system for a four wheel drive vehicle, as disclosed in a Japanese Patent Provisional Publication No. 61-157437 (Application No. 59-276048). In this case, the driving force distribution control system of the present invention is arranged to vary a driving force distribution between front and rear wheels toward a four wheel drive state by increasing a clutch engagement force of a torque distributing clutch when the vehicle is decelerated during a turn with a high lateral acceleration. Therefore, this control system decreases a driving force transmitted to the primary drive wheels which are always connected with an input member of the transfer, and produces a moment in an understeering direction which counteracts a moment in the tack-in direction. Furthermore, as the tendency to the four wheel drive is increased, the secondary drive wheels which are connected with the input member of the transfer through the torque distributing clutch bear a more share of the driving or braking force. Therefore, the control system raises the cornering performance near the limit, and improves the stability of the vehicle. When the vehicle speed is high, the control system can improve the high speed cornering stability by distributing the driving force equally among the four wheels. When the vehicle speed is low, the control system can improve the low vehicle speed yaw response characteristic by increasing the driving force to the rear wheels.

According to the present invention, the control system can employ any of various methods for varying the clutch engagement force. For example, it is possible to employ a duty factor control system including an electromagnetic valve for opening and closing a fluid passage, and a driver circuit for producing a periodic pulse signal having a controlled duty factor (or duty cycle) to actuate the valve. Furthermore, it is possible to employ an electromagnetic clutch.

In the first embodiment, it is possible to omit the acceleration position sensor 144. In the second embodiment, it is possible to omit the brake switch 143.

What is claimed is:

1. A driving torque distribution control system for a vehicle, comprising:

a torque distributing mechanism for dividing a driving torque between first and second drive wheels of the vehicle;

a torque distributing clutch means for varying a torque distribution between said first and second drive wheels by varying a clutch engagement force in response to a control signal, said torque distributing clutch means being provided between a driving torque input side and a driving torque output side of said distributing mechanism;

a sensor means for sensing a decelerating condition of the vehicle, a lateral acceleration of the vehicle and a vehicle speed of the vehicle and for producing sensor signals indicative of said decelerating condition, said lateral acceleration and said vehicle speed; and a controller means for controlling said clutch engagement force of said torque distributing clutch means by producing said control signal in response to said sensor signals supplied from said sensor means, said controller means increasing said clutch engagement force in accordance with said lateral acceleration when the vehicle is decelerated, and increasing a rate of increase of said clutch engagement force with respect to said lateral acceleration when said vehicle speed increases.

2. A control system according to claim 1 wherein said sensor means comprises a deceleration sensing means for sensing said decelerating condition indicative of a deceleration of the vehicle, a lateral acceleration sensing means for sensing said lateral acceleration of the vehicle, and a vehicle speed sensing means for sensing said vehicle speed of the vehicle; and wherein said torque distributing mechanism is a differential mechanism for dividing the driving torque between said first and second drive wheels which are left and right drive wheels.

3. A control system according to claim 1 wherein said controller means includes a means for increasing said clutch engagement force linearly with increase in said lateral acceleration when the vehicle is decelerated and said lateral acceleration is higher than a predetermined threshold value, and increasing said rate of increase of said clutch engagement force with respect to said lateral acceleration as said vehicle speed increases.

4. A control system according to claim 3 wherein said sensor means comprises a deceleration sensing means for sensing said decelerating condition which is characteristic of a deceleration of the vehicle, a lateral acceleration sensing means for sensing said lateral acceleration, and a vehicle speed sensing means for sensing said vehicle speed; and wherein said torque distributing mechanism is one of a differential mechanism for dividing the driving torque between left and right drive wheels and a transfer mechanism for dividing the driving torque between front and rear drive wheels.

5. A control system according to claim 4 wherein said deceleration sensing means includes a means for sensing one of a condition of a brake system of the vehicle, a condition of an accelerator of the vehicle, and a longitudinal deceleration of the vehicle.

6. A driving torque distribution control system for a vehicle, comprising:

a torque distributing mechanism for dividing a driving torque between first and second drive wheels of the vehicle;

a torque distributing clutch means for varying a torque distribution between said first and second drive wheels by varying a clutch engagement force in response to a control signal, said torque distributing clutch means being provided between a driving torque input side and a driving torque output side of said distributing mechanism;

a sensor means for sensing a decelerating condition of the vehicle, a lateral acceleration of the vehicle and a vehicle speed of the vehicle; and a controller means for controlling said clutch engagement force of said torque distributing clutch means by producing said control signal in response to said sensor signals supplied from said sensor means, said controller means increasing said clutch engagement force in accordance with said lateral acceleration when the vehicle is decelerated, and increasing a rate of increase of said clutch engagement force with respect to said lateral acceleration when said vehicle speed increases;

wherein said controller means includes a means for increasing said clutch engagement force linearly with increase in said lateral acceleration when the vehicle is decelerated and said lateral acceleration is higher than a predetermined threshold value, and increasing said rate of increase of said clutch engagement force with respect to said lateral acceleration as said vehicle speed increases;

wherein said sensor means comprises a deceleration sensing means for sensing said decelerating condition which is characteristic of a deceleration of the vehicle, a lateral acceleration sensing means for sensing said lateral acceleration, and a vehicle speed sensing means for sensing said vehicle speed;

wherein said controller means includes a means for producing a discrimination signal when the vehicle is in a predetermined state for decelerating the vehicle and said lateral acceleration is higher than said threshold value, determinig a control gain in accordance with said vehicle speed, determining a first desired clutch engagement force which increases linearly at a rate equal to said control gain with increase in said lateral acceleration, and producing said control signal in accordance with said first desired clutch engagement force only when said discrimination signal is present.

7. A control system according to claim 6 wherein said controller means comprises a gain determining means for determining said control gain which is a monotone nondecreasing function of said vehicle speed, and a first desired clutch engagement force determining means for determining said first desired clutch engagement force which is a monotone nondecreasing function of said lateral acceleration.

8. A control system according to claim 7 wherein said gain determining means includes a means for holding said control gain equal to a predetermined minimum gain value when said vehicle speed is lower than a predetermined first speed value, increasing said control gain linearly with increase in said vehicle speed when said vehicle speed is higher than said first speed value and lower than a predetermined second speed value higher than said first speed value, and holding said control gain equal to a predetermined maximum gain value when said vehicle speed is higher than said second speed value, and said first desired clutch engagement force determining means includes a means for holding said first desired clutch engagement force equal to zero when said lateral acceleration is lower than a predetermined first lateral acceleration value, and increasing said first desired clutch engagement force linearly with increase in said lateral acceleration when said lateral acceleration is higher than said first lateral acceleration value.

9. A control system according to claim 6 wherein said controller means includes a means for determining a second desired clutch engagement force and producing said control signal in accordance with said first desired clutch engagement force when said discrimination signal is present, and in accordance with said second desired clutch engagement force when said discrimination signal is absent.

10. A control system according to claim 9 wherein said controller means includes a means for setting said second desired clutch engagement force equal to zero.

11. A control system according to claim 6 wherein said deceleration sensing means comprises a brake switch which produces a brake signal when a brake system of the vehicle is actuated, and said controller means comprises a condition discriminating means for producing said discrimination signal when said brake signal is present and said lateral acceleration is higher than said threshold value.

12. A control system according to claim 11 wherein said controller means comprises a control signal producing means for producing said control signal in accordance with said first desired clutch engagement force, and limiting an amount of change of said control signal during a predetermined time interval.

13. A control system according to claim 6 wherein said deceleration sensing means comprises an accelerator position sensor for sensing an accelerator opening degree by sensing a position of an accelerator system of the vehicle, and said controller means comprises a discriminating means for producing said discrimination signal when said accelerator opening degree is smaller than a predetermined opening degree value, and said lateral acceleration is higher than said threshold value.

14. A control system according to claim 13 wherein said discriminating means includes a means for producing said discriminating signal only when a time rate of change of said accelerator opening degree is smaller than a predetermined accelerator speed value.

15. A control system according to claim 14 wherein said discriminating means includes a means for setting a flag signal to a first signal state when said accelerator opening degree is smaller than said predetermined opening degree value, said lateral acceleration is higher than a predetermined second lateral acceleration value which is higher than a predetermined first lateral acceleration value, and said time rate of change of said accelerator opening degree is smaller than said predetermined accelerator speed value, and setting said flag signal to a second signal state when at least one of a first condition that said accelerator opening degree is greater than said opening degree value, and a second condition that said lateral acceleration is lower than said first lateral acceleration value is satisfied, and said controller means comprises a desired clutch engagement force determining means for determining said first desired clutch engagement force when said flag signal is in said first signal state, and determining a second desired clutch engagement force when said flag signal is in said second signal state, and a control signal producing means for producing said control signal in accordance with said first desired clutch engagement force when said flag signal is in said first signal state, and in accordance with said second desired clutch engagement force when said flag signal is in said second signal state.

16. A control system according to claim 6 wherein said deceleration sensing means comprises an accelerator position sensing means for sensing a position of an accelerator system of the vehicle, and determining an accelerator opening degree which is a throttle opening degree of said accelerator system; and said controller means comprises a differentiating means for determining a time rate of change of said accelerator opening degree; a condition discriminating means for comparing said accelerator opening degree with a predetermined opening degree value, further comparing said lateral acceleration with a predetermined lateral acceleration value, determining whether a flag signal is in a first signal state, further comparing said time rate of change of said accelerator opening degree is smaller than a predetermined accelerator speed value, further comparing said lateral acceleration with a second predetermined acceleration value which is higher than said first lateral acceleration value, and producing a first affirmative signal when said accelerator opening degree is smaller than said opening degree value, a first negative signal when said accelerator opening degree is equal to or greater than said accelerator opening degree value, a second affirmative signal when said lateral acceleration is higher than said first lateral acceleration value, a second negative signal when said lateral acceleration is equal to or lower than said first lateral acceleration value, a third affirmative signal when said flag signal is in said first signal state, a third negative signal when said flag signal is in a second signal state, a fourth affirmative signal when said time rate of change of said accelerator opening degree is smaller than said accelerator speed value, a fourth negative signal when said time rate of change of said accelerator opening degree is equal to or greater than said accelerator speed value, a fifth affirmative signal when said lateral acceleration is higher than said second lateral acceleration value, and a fifth negative signal when said lateral acceleration is equal to or lower than said second lateral acceleration value, setting said flag signal to said first signal state when said first, second, fourth and fifth affirmative signals are all present, setting said flag signal to said second signal state when at least one of said first, second, fourth and fifth negative signals is present; a desired clutch engagement force determining means for determining said first desired clutch engagement force when said first, second and third affirmative signals are present, and further determining a second desired clutch engagement force which is fixed at zero when said flag signal is in said second signal state; and a control signal producing means for producing said control signal by using one of said first and second desired clutch engagement forces.

* * * * *